United States Patent
Orlando

[11] 3,774,128
[45] Nov. 20, 1973

[54] MAGNETIC TYPE SENSOR
[75] Inventor: Vincent A. Orlando, Clearwater, Fla.
[73] Assignee: General Motor Corporation, Detroit, Mich.
[22] Filed: July 10, 1972
[21] Appl. No.: 270,549

[52] U.S. Cl. ........... 335/81, 200/61.45 M, 335/280, 340/262
[51] Int. Cl. .......................................... H01h 51/26
[58] Field of Search ............. 200/61.45 M, DIG. 29; 335/1, 2, 229, 230, 80, 81, 82, 236, 234, 280; 340/262

[56] References Cited
UNITED STATES PATENTS
2,997,557  8/1961  Gillmor et al. .............. 200/61.45 M
3,619,524  11/1971  Gillund ........................ 200/61.45 M

*Primary Examiner*—Harold Broome
*Attorney*—W. E. Finken et al.

[57] ABSTRACT

A magnetic type sensor includes an elongated housing having upper and lower spaced planar walls interconnected by arcuate end walls and side walls. A transverse wall includes a pair of angularly related wall portions each having a free end engaging a respective integral rib of one of the side walls. An axial pole magnet has one pole face engaged by the juncture of the wall portions to seat the other pole face thereof on a flat of one of the end walls. A plurality of deflectable contact fingers are mounted on the other end wall and a ball is received between the upper and lower walls for movement on the lower wall between an unactuated position, wherein the ball engages a ball seat provided by the juncture of the transverse wall, and an actuated position, wherein the ball engages one or more of the contact fingers. The ball is held in engagement with the ball seat by the flux of the magnet and moves into engagement with the contact fingers when subjected to a planar impulse of predetermined amplitude and time directed within the included angle d amplitude and time directed within the included angle of the transverse wall. An external bracket includes a first U-shaped portion having one leg portion extending from an upper diametrical side of the ball to the other end wall, a bight portion extending around the other end wall of the housing and the contact fingers, and a lower leg portion extending from the bight portion to a lower diametrical side of the ball. A second portion of the bracket extends from the lower diametrical side of the ball under the magnet and then upwardly along the one end wall of the housing opposite the other pole face of the magnet. The second portion of the bracket includes an opening or air gap underneath the one pole face of the magnet. The bight portion of the first portion of the bracket includes a selectively energizable DC electromagnet for selectively moving the ball into engagement with the contact fingers for test purposes, with the flux path being provided by the first portion of the bracket and by the ball. The magnet and the second portion of the bracket provide a parallel flux path through the ball. The opening or air gap reduces magnetic fringing from the one pole face of the magnet and directs the flux from this pole face through the ball to the second portion of the bracket rather than directly to the second portion of the bracket to thereby resist bounce of the ball between the upper and lower walls of the housing.

9 Claims, 3 Drawing Figures

PATENTED NOV 20 1973 3,774,128

MAGNETIC TYPE SENSOR

This invention relates generally to magnetic type sensors and more particularly to sensors of this type which include a magnet holding a ball in unactuated position in engagement with a ball seat and against movement to an actuated position unless the ball is subjected to a planar acceleration pulse of predetermined amplitude and time.

Sensors of the aforenoted type are well known. The ball may move within a tube, within a circular housing, or in a sector-shaped recess, between unactuated and actuated positions.

While the sensor of this invention is of this type it differs therefrom in several important features.

One feature is that the ball is held in engagement with a ball seat by an axial pole magnet, with the flux path including one portion of a member independent of the housing within which the magnet and ball are mounted. The member is external of the housing and the one portion is located beneath the ball and the wall of the housing along which the ball moves to actuated position. Thus, the flux exerts a downward bias on the ball and limits bounce of the ball relative to the housing wall. Another feature of this invention is that the one portion of the external member includes an opening or air gap below the one pole face of the magnet adjacent the ball seat. This reduces magnetic fringing and ensures that the flux passes from the one pole face through the ball to the one portion of the external member rather than from the one pole face to the external member. A further feature of this invention is that the external member includes a second portion cooperating with the ball and a selectively energizable DC electromagnet in providing a flux path parallel to the first flux path for selectively moving the ball to actuated position for test purposes. Although the second path includes the ball, it is parallel and independent to the first path to ensure that there will be no demagnetization of the permanent magnet when the electromagnet is selectively energized.

These and other features of the sensor of this invention will be readily apparent from the following specification and drawings wherein.

Figure 1:
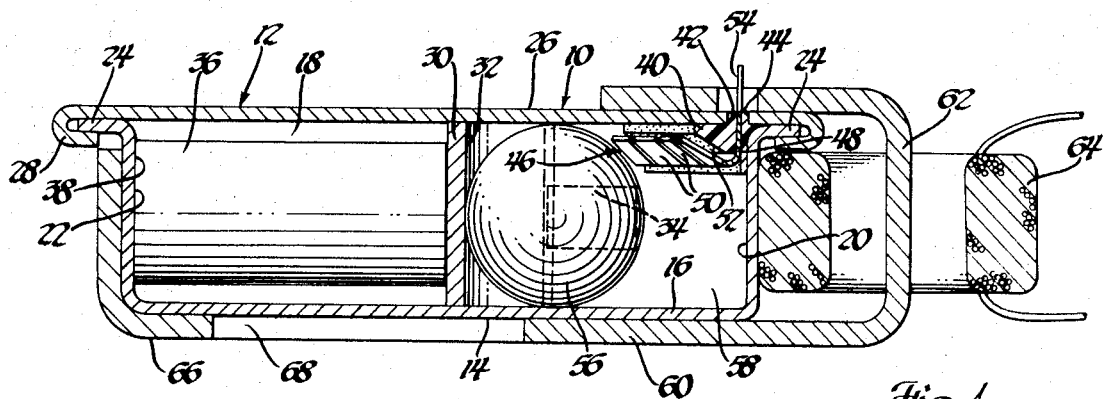
FIG. 1 is a longitudinal sectional view of a sensor according to this invention, with the ball being shown in unactuated position and the electromagnet being de-energized.

Referring now particularly to the drawings, a sensor 10 according to this invention includes a generally closed housing 12. The housing 12 includes a lower elongated housing portion 14 which includes a planar base or lower wall 16, spaced parallel side walls 18, and generally arcuate end walls 20 and 22 with the walls 18, 20 and 22 being formed integral with each other and providing a continuous vertical wall having a continuous laterally extending flange 24. The housing 12 further includes an upper housing portion in the form of an upper planar wall 26 which seats on flange 24 so as to be located in generally parallel spaced relationship to the wall 16. Wall 26 is hem flanged at 28 to the flange 24 to thereby substantially seal or close housing portion 14.

Figure 2:
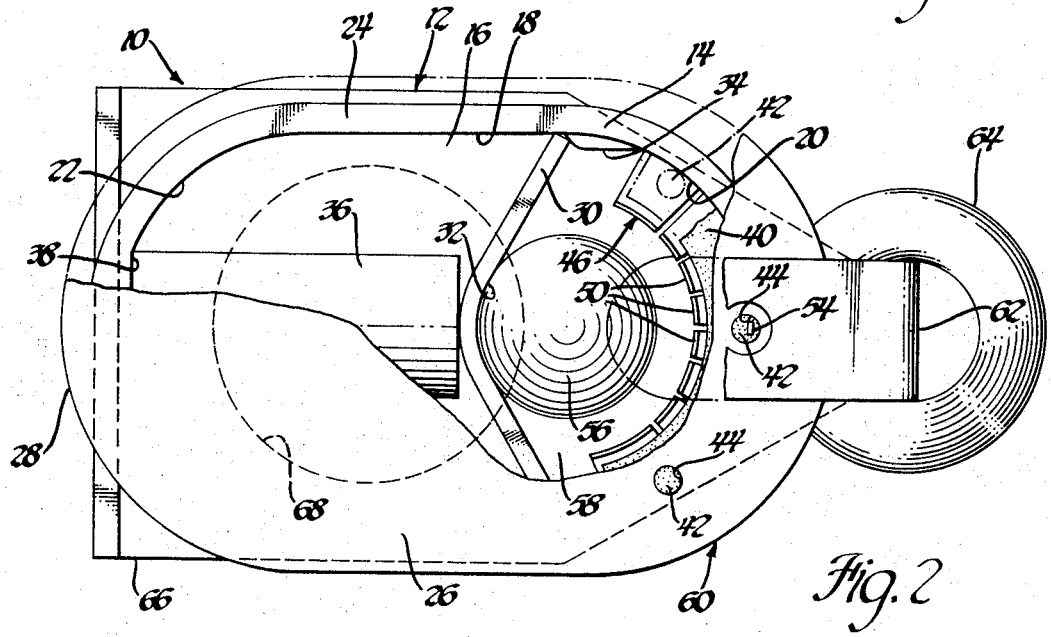
FIG. 2 is an enlarged partially broken away top plan view of the sensor.
Figure 3:
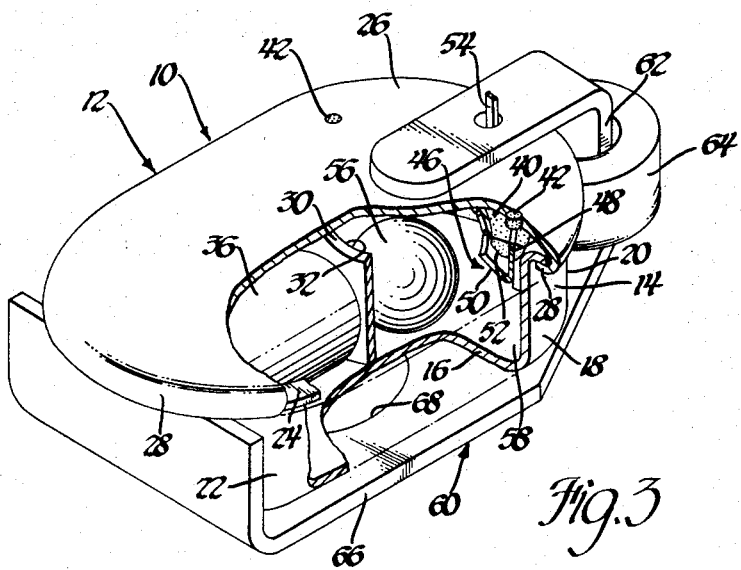
FIG. 3 is a partially broken away perspective view of the sensor.

A transverse wall 30 includes a pair of angularly related wall portions as can be seen in FIG. 2, the integral juncture of which provides a ball seat 32 as will be further described. The free ends of wall 30 engage integral ribs or abutments 34 of walls 18 and 20. An axial pole permanent magnet 36 has one pole face thereof engaging the juncture of the wall 30 opposite the ball seat 32 to hold the other pole face thereof in engagement with a flat 38 of the end wall 22 and thereby mount the permanent magnet 36 within the housing 12 with its axis generally coplanar with the longitudinal axis of the housing and with a bisector of the included angle defined by the wall portions of wall 30.

A contact mounting member 40 of generally arcuate shape is formed of dielectric material and is secured to the wall 26 in engagement with the wall 20 by a series of integral posts or extensions 42 thereof received within openings 44 in the wall 26. A contact 46 of arcuate shape includes a base portion 48 which is embedded within the member 40 and a series of integral independently deflectable spring fingers 50 which extend from the base portion. Fingers 50 underlie a sloping face 52 of the mounting member which limits deflection of the fingers 50 upwardly of the housing 10 and prevents any of the fingers taking a permanent set when the fingers are engaged and deflected by a ball as will be further described. A post 54 extends from the base portion 48 upwardly through one of the openings 44 of wall 26 for connection to a battery or other source of power and the mechanism to be actuated by the sensor 10, as will be described.

A ball 56 of predetermined mass or weight is received within the generally sector-shaped recess 58 defined vertically by walls 30 and 20 and the portions of walls 18 therebetween, and horizontally by walls 16 and 26. The ball is normally located by the permanent magnet 36 in its unactuated position as shown in engagement with the ball seat 32, as will be described. When the ball is subjected to a planar impulse of predetermined amplitude and time within the included angle defined by wall 30, it moves relative to the ball seat 32 against the flux of the magnet 36 and into engagement with one or more of the spring fingers 50 to thereby complete the circuit across the source of power through the housing 12 and the mechanism to be actuated.

An external member or bracket 60 includes a first generally U-shaped portion 62 which includes a tapered lower leg extending from the lower diametrical side of the ball 56 past wall 20, a bight portion extending upwardly, and an upper leg extending over the contact fingers 50 and generally to the upper diametrical side of the ball 56 opposite the lower diametrical side thereof. The bight portion is received through a selectively energizable DC electromagnet 64. The upper leg is apertured to permit post 54 to extend therethrough.

The bracket 60 further includes a second generally L-shaped portion 66 which is integral with portion 62 and includes a lower leg which extends from the lower diametrical side of ball 56 and underneath the permanent magnet 36 to wall 22, and an upwardly extending leg which extends along the flat 38 of wall 22 generally opposite the other pole face of the magnet 36. The portion 66 of the bracket includes an enlarged circular opening 68 which is located generally underneath the one pole face of the magnet 36 and the ball seat 32.

The portion 66 of the bracket 58 provides a flux path between the lower diametrical side of ball 56 and the other pole face of the magnet 36 externally of the housing 12, with the magnet and ball completing the path. The flux passing from the ball to the portion 66 of the bracket exerts or places a downward force or bias on the ball tending to hold the ball against the lower wall 16 of housing 12 and resisting bouncing or movement of the ball relative to this wall.

The opening 68 provides an air gap between the one pole face of the magnet and the portion 66 to ensure that the flux will pass from the one pole face to the ball rather than pass from the one pole face to the portion 66 of the bracket. Additionally, the opening reduces magnetic fringing and permits the use of less expensive permanent magnets than would be required if this opening were not present. However, it should be noted that the opening may or may not be used depending on the particular requirements which the sensor must meet.

The first portion 62 of bracket 60 and ball 56 provide a second flux path which is parallel to and independent of the first flux path between the ball and the permanent magnet 36. When the coil 64 is energized, the ball 56 will move to the right and engage one or more of the contact fingers 50. This movement can be used in conjunction with a conventional test circuit to test the performance of the sensor 10. Since the second flux path does not include the permanent magnet 36, no demagnetization of this magnet can occur.

The sensor 10 is particularly intended for use with an inflatable occupant restraint system of a vehicle body which includes an inflatable occupant restraint cushion and a source of pressure fluid or inflator which must be electrically actuated, such as by ignition of one or more gas generators or the rupture of a diaphragm or both, when the vehicle receives an impact of certain magnitude to inflate the cushion. Normally the sensor 10 would be mounted on the body in a location so as to receive impulses generated by impact of the vehicle with an obstacle. When such an impact generates a pulse of predetermined amplitude and time, the ball 56 will move into engagement with one or more of the contact fingers 50 to thereby complete a circuit across the source of power and through the ball and housing to electrically actuate the pressure fluid source. The sensor 10 is, of course, responsive only to generally planar impulses which are received within the included angle defined by the angular portions of the wall 30.

Thus, the invention provides an improved magnetic sensor.

I claim:

1. A sensor comprising, in combination, a support including a ball seat, a ball of predetermined mass and responsive to magnetic flux, said ball being movable relative to the support between an unactuated position in engagement with the ball seat and an actuated position remote therefrom, a magnet having one pole thereof located adjacent the ball seat and providing a source of magnetic flux to hold the ball in engagement with the ball seat against movement to actuated position unless the ball is subjected to a pulse of predetermined amplitude and time, means independent of the support providing a flux path between the ball and the other pole of the magnet, and means in the flux path providing an air gap adjacent the one pole of the magnet to reduce magnetic fringing and direct the flux between the one pole of the magnet and the ball rather than between the one pole of the magnet and the flux path to thereby hold the ball in engagement with the ball seat and resist ball bounce relative to the one side of the wall.

2. A sensor comprising, in combination, a support including a ball seat, a ball of predetermined mass and responsive to magnetic flux, said ball being movable relative to the support between an unactuated position in engagement with the ball seat and an actuated position remote therefrom, a magnet having one pole thereof located adjacent the ball seat and providing a source of magnetic flux to hold the ball in engagement with the ball seat against movement to actuated position unless the ball is subjected to a pulse of predetermined amplitude and time, means independent of the support providing a first flux path between the ball and the other pole of the magnet, a selectively energizable coil mounted on the support in spaced relationship to the magnet and ball seat, and means independent of the support providing a second flux path through the ball and the coil.

3. A sensor comprising, in combination, a support including a ball seat, a ball of predetermined mass and responsive to magnetic flux, said ball being movable relative to the support between an unactuated position in engagement with the ball seat and an actuated position remote therefrom, a magnet to one side of the seat and having one pole thereof located adjacent the ball seat, the magnet providing a source of magnetic flux to hold the ball in engagement with the ball seat against movement to actuated position unless the ball is subjected to a pulse of predetermined amplitude and time, means independent of the support providing a first flux path between the ball and the other pole of the magnet, means in the first flux path providing an air gap adjacent the one pole of the magnet to reduce magnetic fringing and direct the flux between the one pole of the magnet and the ball rather than between the one pole of the magnet and the flux path to hold the ball in engagement with the ball seat and resist ball bounce relative to the support, a selectively energizable coil to an opposite side of the ball seat and spaced therefrom, and means independent of the support providing a second flux path through the ball and coil.

4. A sensor comprising, in combination, a support including a ball seat, a ball of predetermined mass and responsive to magnetic flux, said ball being movable relative to the support between an unactuated position in engagement with the ball seat and an actuated position remote therefrom, contact means engageable by the ball upon movement thereof to actuated position, a magnet having one pole thereof located adjacent the ball seat and providing a source of magnetic flux to hold the ball in engagement with the ball seat against movement to actuated position unless the ball is subjected to a pulse of predetermined amplitude and time, means independent of the support providing a flux path extending from the other pole of the magnet along the magnet, past one diametrical side of the ball to the contact means and from the contact means to an opposite diametrical side of the ball, the one portion of the flux path between the other pole of the magnet and the one diametrical side of the ball serving the flux of the magnet, and a selectively energizable coil in the other portion of the flux path for moving the ball to actuated position when selectively energized.

5. A sensor comprising, in combination, a substantially closed housing including a generally planar base wall and a ball seat, a ball of predetermined mass and responsive to magnetic flux, said ball being movable along the inside of the base wall between an unactuated position in engagement with the ball seat and an actuated position remote therefrom, a magnet within the housing having one pole thereof located adjacent the ball seat and providing a source of flux to hold the ball in unactuated position against movement to actuated position unless the ball is subjected to a pulse of predetermined amplitude and time, and means below the base wall providing a flux path between the ball and the other pole of the magnet to direct the flux from the one pole of the magnet downwardly through the ball and thereby resist bounce of the ball relative upwardly of the base wall.

6. A sensor comprising, in combination, a substantially closed housing including a generally planar base wall and a ball seat, a ball of predetermined mass and responsive to magnetic flux, said ball being movable along the inside of the base wall between an unactuated position in engagement with the ball seat and an actuated position remote therefrom, a magnet within the housing having one pole thereof located adjacent the ball seat and providing a source of flux to hold the ball in unactuated position against movement to actuated position unless the ball is subjected to a pulse of predetermined amplitude and time, means below the base wall providing a flux path between the ball and the other pole of the magnet externally of the housing to hold the ball in unactuated position, and means providing an air gap in the flux path in the area thereof adjacent the one end of the magnet to reduce magnetic fringing and direct the flux from the one pole of the magnet through the ball rather than to the flux path and thereby resist bounce of the ball relative to the base wall.

7. A sensor comprising, in combination, a substantially closed housing including a generally planar base wall and a ball seat, contact means spaced from the ball seat, a ball of predetermined mass and responsive to magnetic flux, said ball being movable along the inside of the base wall between an unactuated position in engagement with the ball seat and an actuated position in engagement with the contact means, a magnet within the housing having one pole thereof located adjacent the ball seat and providing a source of flux to hold the ball in unactuated position against movement to actuated position unless the ball is subjected to a pulse of predetermined amplitude and time, means externally of the housing providing a first flux path between the ball and the other pole of the magnet and a second flux path between the ball and the contact means, and means in the second flux path for selectively providing a flux to move the ball to actuated position.

8. A sensor comprising, in combination, a generally closed elongated housing including planar spaced walls, an axial pole magnet coaxial with the longitudinal axis of the housing, a transverse wall including a pair of angularly related wall portions having their free ends secured to the side walls of the housing and their apical ends providing a ball seat and engaging one pole face of the magnet to hold the other pole face thereof in engagement with an end wall of the housing, contact means adjacent the other end wall of the housing, a ball responsive to magnetic flux, said ball being movable along one planar wall of the housing between an unactuated position in engagement with the ball seat under the influence of the flux of the magnet and an actuated position in engagement with the contact means when subjected to a pulse of predetermined amplitude and time, means externally of the housing providing a first flux path between the ball and the other pole face of the magnet, means externally of the housing providing a second flux path around the housing and through the ball, and a selectively energizable coil in the second flux path to provide selective movement of the ball from unactuated position to actuated position.

9. A sensor comprising, in combination, a support, a ball seat on the support, contact means on the support spaced from the ball seat, a ball of predetermined mass and responsive to magnetic flux, said ball being movable relative to the support between an unactuated position in engagement with the ball seat and an actuated position remote in engagement with the contact means, a magnet having one pole face thereof located adjacent the ball seat and providing a source of flux to hold the ball in unactuated position against movement to actuated position unless the ball is subjected to a pulse of predetermined amplitude and time, means providing a first flux path between the ball and the other pole face of the magnet, means providing a second parallel flux path through the ball and an electromagnet in the second path for moving the ball to actuated position.

* * * * *

PO-1050
(5/69)

UNITED STATES PATENT OFFICE
CERTIFICATE OF CORRECTION

Patent No. 3,774,128  Dated November 20, 1973

Inventor(s) Vincent A. Orlando

It is certified that error appears in the above-identified patent and that said Letters Patent are hereby corrected as shown below:

In the heading, after "Assignee:", "General Motor Corporation" should read -- General Motors Corporation --.

In the Abstract, second column, lines 9 and 10, the following language should be deleted: "d amplitude and time directed within the included angle".

Signed and sealed this 16th day of April 1974.

(SEAL)
Attest:

EDWARD M. FLETCHER, JR.
Attesting Officer

C. MARSHALL DANN
Commissioner of Patents